United States Patent [19]
Bradley et al.

[11] Patent Number: 5,982,862
[45] Date of Patent: Nov. 9, 1999

[54] DIAL INBOUND METER INTERFACE UNIT WHICH DERIVES POWER FROM TELEPHONE LINE WHEN TELEPHONE IS RINGING

[75] Inventors: Benjamin Clinton Bradley, Norcross; Victor Christopher Trifu, Lilburn, both of Ga.

[73] Assignee: Schlumberger Industries, Inc.

[21] Appl. No.: 08/677,620

[22] Filed: Jul. 8, 1996

[51] Int. Cl.[6] .................................................. H04M 11/00
[52] U.S. Cl. ...................................................... 379/106.06
[58] Field of Search ..................... 379/106.06, 106.03, 379/106.04, 106.01, 106.07, 106.11

[56] References Cited

U.S. PATENT DOCUMENTS

| 5,204,896 | 4/1993 | Oliver | 379/106.06 |
| 5,235,634 | 8/1993 | Oliver | 379/106.06 |
| 5,454,031 | 9/1995 | Gray et al. | 379/106.06 |

*Primary Examiner*—Wing F. Chan
*Attorney, Agent, or Firm*—Leonard W. Pojunas

[57] ABSTRACT

The invention is a dial inbound MIU which includes a rechargeable power supply, such as a double layer capacitor (sometimes called a "supercapacitor" or a "SuperCap") or a rechargeable battery. The power supply can be recharged from the telephone line, either from the DC current available when the phone line is on-hook or off-hook or from the AC current which is available when the telephone line is ringing.

12 Claims, 9 Drawing Sheets

DIAL INBOUND METER INTERFACE UNIT WHICH DERIVES POWER FROM TELEPHONE LINE WHEN TELEPHONE IS RINGING

BACKGROUND OF THE INVENTION

The present invention relates to an apparatus for calling a central computer and transmitting metering information over the telephone lines. In particular the present invention relates to a dial inbound Meter Interface Unit ("MIU") which derives its power from the telephone line, particularly from a ringing telephone line, to which the MIU is connected.

As used herein, the term Meter Interface Unit ("MIU") refers to an electronic unit located at the residence or business location of a customer of a public utility (water, gas, electricity, or heat). While the term "MIU" is generally used to refer to devices which interface a utility meter with a medium such as telephone or radio ("RF"), as used herein, the term "MIU" will be limited to telephone MIUs, particularly telephone MIUs which are used for dial inbound purposes.

A dial inbound MIU is one which calls a central computer system located at an office of the public utility. The central computer is typically equipped with a number of modems and telephone lines for placing and receiving telephone calls to and from remote MIUs which are located at customers' locations. A dial inbound MIU is an MIU which is used to call the central computer from a customer's location.

Heretofore, dial inbound MIUs have been used to dial central computers for the purpose of transmitting utility metering data from the customers' meters to the utility. The MIU dials the central computer periodically or at a time which has been predetermined and entered into the MIU, either directly (typically at the time the MIU is first installed at a customer's location) or downloaded to the MIU by the central computer (when the MIU dials the central computer to upload metering information). In a typical transaction, an MIU reads metering information from a meter, dials the central computer, and uploads the metering data via modem to the central computer. While the MIU is connected to the central computer, the central computer may download certain information to the MIU, such as the time at which the MIU should next send meter data to the central computer. Thus, one feature of the MIU is that it must have knowledge of its next call back time. In order to retain this information, the MIU typically has a semiconductor device called a real time clock which retains either the real time, typically expressed as month, day, year and hour, minute, second, or, alternatively, a countdown of days, hours, minutes, and seconds (although possibly expressed as only hours, minutes, seconds, or even only as seconds) to the next call.

In a typical installation at a customer's residence, there may be only a single telephone line which serves the residence. Accordingly, there must be provisions within the MIU to enable the MIU to detect whether the telephone line is in use, so that the MIU can determine whether it can make use of (seize) the telephone line. In addition, after the MIU has seized the telephone line, it must be able to detect whether an extension to the seized telephone line has been lifted off-hook by someone at the location, in which event the MIU must release the telephone line to the other user.

In view of the electronic circuitry within an MIU and the typical desire to prevent power outages from causing the circuitry to lose information, such as the current time or call-back time, both of which require the real time clock circuit, it is desirable for an MIU to be able to be operated independently of the AC power at the customer's location. Thus, it has heretofore been typical for dial inbound MIUs to be operated by either internal or external batteries.

U.S. Pat. Nos. 4,455,453; 4,469,917; 4,847,892; and 4,578,534 all disclose dial inbound MIUs which are powered by external batteries. The use of an external battery renders an MIU more costly to maintain than an internal battery. In addition, external battery supplies can interfere with the installation of MIUs in confined spaces, such as pits or service boxes.

U.S. Pat. No. 4,644,103 discloses an MIU which derives its operating current from a telephone line. As described in that patent, telephone line current is used to energize a tone detection circuit in the MIU. The tone detection circuit is responsible for determining if the MIU is being interrogated by the central computer. The tone detection circuit operates intermittently. Power is used every few seconds to ensure that the circuit is functioning properly. The short powered discharge intervals associated with the device limit its capability solely to signal detection. In addition, the telephone must be frequently placed in the off-hook state to accommodate recharging of a voltage regulating capacitor. Such constant recharging of the capacitor increases the likelihood that there will be interference with the customer's use of the telephone line.

A legal limitation on the use of the telephone line as a source for powering an MIU is found in the Code of Federal Regulations, 47 C.F.R. §68.312, which limits the amount of current which can be drawn from a telephone line while the telephone is in the "on-hook" state. In the on-hook state, the telephone handset is placed on the telephone receiver, where it depresses a switch which disconnects the telephone instrument from the telephone line, resulting in an open circuit. When a telephone instrument is in the on-hook state, it is commonly referred to as being "hung up". While in the on-hook state, a device connected to the telephone line must have an effective DC resistance between the pair of telephone wires (which are called "tip" and "ring") of the telephone line which is greater than 5 megohms for all DC voltages up to and including 100 volts. A 5 megohm resistance would correspond to a draw of about 9.6 microamps if the voltage between the tip and ring wires was about 48 volts.

When the handset is lifted "off-hook", the telephone is connected to the line, and current flows through the telephone instrument. In the off-hook state, the telephone is available for use by the customer (or by a device connected to the telephone lines). In accordance with the Code of Federal Regulations, 47 C.F.R. §68.312, while off-hook, there is no limit with respect to the amount of DC current that may be drawn from the telephone line.

In U.S. Pat. No. 5,454,031 ("the '031 patent"), a dial inbound MIU is described which derives its power from a telephone line, storing the power in a double layer capacitor. As described in that patent, DC current can be drawn from the telephone line, while the telephone is in the on-hook state, to charge the double layer capacitor. Further, that patent describes drawing additional DC current from the telephone line while the telephone is in the off-hook state for charging the double layer capacitor. As described in the '031 patent, when the telephone line is on-hook DC current is drawn through a large resistor (10 megohm). As the specifications for a telephone line requires only a minimum of 21 volts between tip and ring when the telephone is in the on-hook state, the amount of DC current which can be drawn by the circuit described in that patent is limited to as little as 2.1 microamps. While the '031 patent describes the charging of the double layer capacitor using the DC current which is available while the telephone is both in the on-hook state and when the telephone is in the off-hook state, it specifically fails to mention one particularly useful charging opportunity. In particular, 47 C.F.R. §68.312 permits a telephone device to draw considerably more current when on-hook and ringing, than when on-hook and not ringing, as during a ringing condition, AC current is available.

SUMMARY OF THE INVENTION

The present invention is a dial inbound MIU which derives its power from a telephone line. In particular, in addition to being able to derive and store power in a double layer capacitor or a rechargeable battery from the DC current on the line when the telephone is either in the on-hook state or in the off-hook state, the MIU of the present invention is also able to capture and store a significant amount of energy from the telephone line when the telephone is ringing, as additional AC current is then available.

In another aspect of the invention, a unique circuit is provided to couple the MIU to a meter with which the MIU is interfaced. The unique circuit uses only two isolation elements, namely a transformer and an optocoupler, to bring both power and clock signals from the MIU to the meter, and to bring data from the meter to the MIU.

DETAILED DESCRIPTION OF THE PREFERRED EMBODIMENT OF THE INVENTION

The purpose of the dial inbound MIU of the present invention is to dial a central computer to report utility meter readings at a customer's site. The dial inbound function is accomplished automatically, i.e., without the intervention of either the customer or the utility company.

Figure 1:
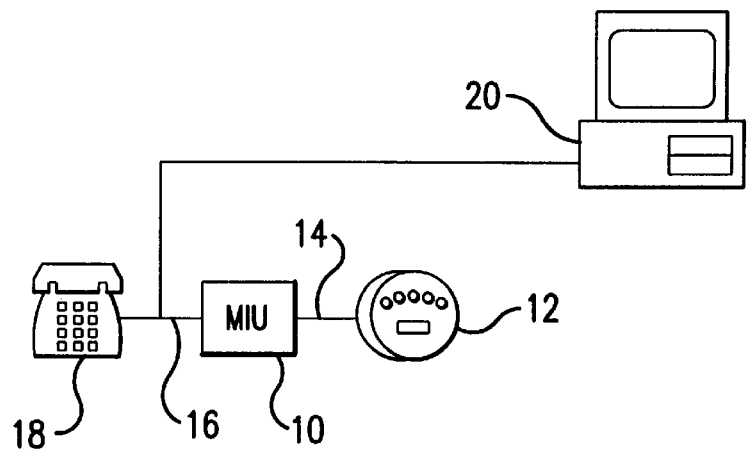
FIG. 1 is a diagram showing how the MIU of the present invention is connected to a meter, the telephone line, and to a central computer.

In FIG. 1, there is a diagram showing a dial inbound MIU 10 connected to an electricity meter 12 by means of a cable 14. The MIU 10 is also connected to a telephone line 16 in parallel with a telephone set 18, at the customer's location. As described above, the MIU 10 can periodically read the meter 12, and then place a telephone call to a modem equipped computer 20 which is located at the utility. During that telephone call, the MIU 10, will upload to the computer 20 the readings of the meter 12. While an electricity meter 12 is shown in FIG. 1, other types of utility meters, such as gas, water, or heat meters could also be used. In fact, while utility meters are the most common use for dial inbound MIUs, of the type described herein, there is no reason why such MIUs could not be used for other applications in which there is either a central billing or a central stocking of a remotely operated unit. Thus, for example, an MIU could be attached to a soda or candy machine (so that a central computer could be used for restocking purposes), or to washer and dryer units in a laundromat (to permit an off-site owner or manager to decide when to make coin pickups), or to a photocopy machine in an office (so that a service could either bill or restock supplies). As the most common use for MIUs is for utility meter reading, however, that application will be described herein. Those skilled in the art will recognize, however, that many other applications could be made of MIUs.

Figure 2:
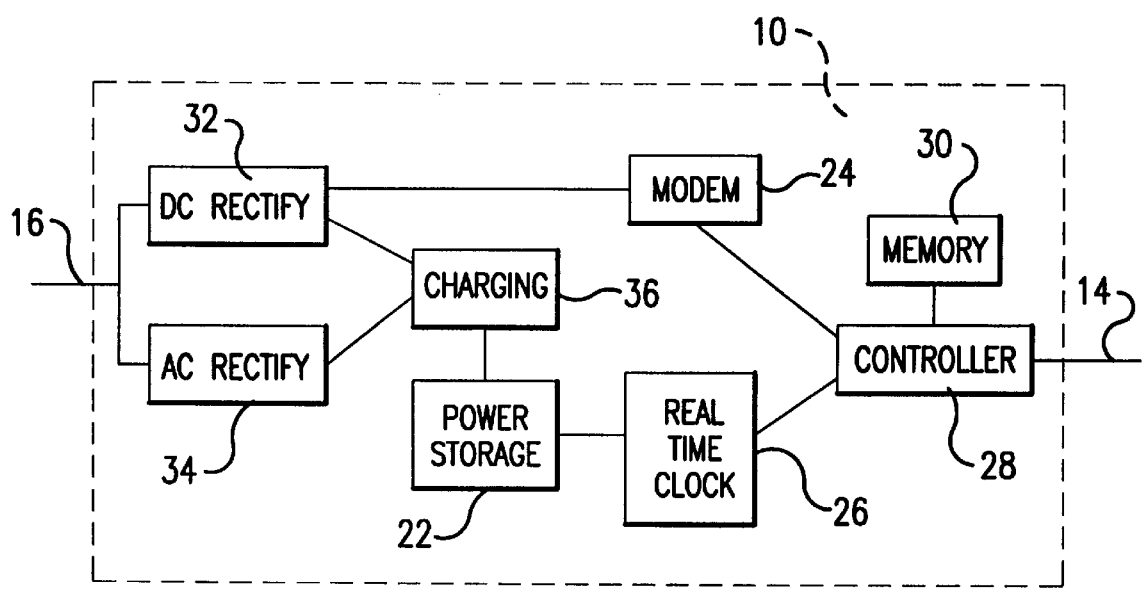
FIG. 2 is a block diagram of the MIU of the present invention.

Referring now to FIG. 2, a block diagram of the MIU 10 of the present invention is shown. As illustrated, the MIU is connected to the telephone line 16 from which it draws operating current as will be explained hereinafter. In normal operation, the MIU 10 does not need to make use of a power source other than the telephone line 16. However, the MIU may include either an internal battery or an external battery or other power supply. Preferably, however, the MIU is operated solely from a rechargeable internal power source, such as a rechargeable battery (For example, such as a nickel cadmium, a nickel metal hydride, or a lithium hydride battery, although other batteries could be used.) or a large double layer capacitor, such as the capacitor 22 used in the preferred embodiment of the invention. The MIU 10 communicates with the central computer 20 (See FIG. 1) via the telephone line 16. The MIU uses a built-in modem 24 to dial the central computer 20, typically at a predetermined time which is stored in a real time clock U5 within the MIU 10. The operation of the MIU 10, is controlled by a microprocessor, or by a microcontroller 28, which may have either onboard or external memory 30. The internal power source 22 can be recharged from power available from the telephone line 16 by means of either a DC rectification circuit 32, or, in accordance with the preferred embodiment of the invention, from an AC rectification circuit 34. In either case, there is additional charging circuitry 36 which couples the internal power source 22 to the telephone line 16. The charging circuitry 36 insures the proper charging of the internal power source 22 without violating the requirements of the Code of Federal Regulations. In particular, the charging circuitry 36 allows the power source 22 to be charged using DC current while the telephone is in the on-hook state or in the off-hook state, and it also allows the power source 22 to be charged using AC current, while the telephone is in the on-hook, ringing state.

Before the MIU seizes the telephone line 16 to call the central computer, the MIU 10 determines whether the telephone line is in use by a customer who has picked up the phone 18 (See FIG. 1), so as to avoid interrupting the customer's use of the line. If the telephone line is in use, then the MIU 10 will not seize the telephone line. In addition, if the MIU 10 is using the telephone line and it detects that an extension telephone 18 (which is hooked in parallel to the telephone line used by the MIU) has been lifted off-hook, then the MIU 10 will release the telephone line in order to prevent the customer from having to wait until the MIU 10 is done with the line.

As stated above, the MIU 10 includes a real time clock U5 which regulates the MIU's time dependent functions. In the preferred embodiment of the invention, the real time clock U5 is a Dallas Semiconductor DS1305E Real Time Clock, which is a very low power CMOS part. In addition to those functions whose timing is determined by the real time clock 26, the MIU 10 is also able to dial into the central computer 20 to report an event for which the MIU 10 has been programmed to dial the central computer 20. For example, if the MIU 10 receives an alarm indicating that it should call home, and it has been programmed to dial the central computer 20 upon the occurrence of such alarm, then it will do so, as well. For example, the MIU 10 can be programmed to call the computer 20 if there is a single ring of the telephone line.

Referring now to FIGS. 3A–3H, a detailed electrical schematic of the MIU 10 of the present invention is shown. As illustrated in FIGS. 3A–3H, the MIU 10 includes a pair of full wave rectifier bridges 40, 42. In particular there is a DC fill wave rectifier bridge 40 which is connected between the tip and ring lines 44, 46 of the telephone line 16. The DC rectifier bridge 40 is used by the MIU 10 to receive DC current from the telephone line 16, as will be explained hereinafter.

The tip and ring lines 44, 46 which connect the MIU 10 to the telephone line 16 are connected to a protective device 48, which in the preferred embodiment of the invention is manufactured by Mitsubishi prevents transients on the telephone line 16 from damaging the circuitry of the MIU 10.

The present invention differs from the MIUs of the prior art in that it also includes a second, AC fill wave rectifier bridge 42 which is connected to the tip and ring lines 44, 46 through resistors R32, R33 and capacitors C15, C16, whereby the AC full wave rectifier bridge 42 is able to produce a DC output for use in capturing and storing energy in response to the AC current which flows when a ringing signal is imposed on the line 16.

With continued reference to the schematic diagram, DC power from the DC fill wave rectifier bridge 40 is brought on a line (called "LINE") through a resistor R26 and diode D11 to charge the internal, rechargeable power source, which is comprised of a double layer capacitor C23 in the preferred embodiment of the invention. While capacitor C23 is used to store sufficient energy to maintain power to a real time clock circuit U5 comprised of a Dallas Semiconductor DS1305E Real Time Clock integrated circuit, as explained herein, other rechargeable devices (e.g., rechargeable batteries) could be used.

In the preferred embodiment of the invention, when the telephone line 16 is in the on-hook state (and not ringing), DC current is drawn from the telephone line 16 (through the DC rectifier bridge 40) and passes through R26, a 5.1 megohm resistor. This resistor R26 limits the amount of DC current which is drawn from the telephone line 16 to an amount which is permitted by the Code of Federal Regulations. Such current is used to charge the double layer capacitor C23 while the telephone line 16 is in the on-hook state (and it is not ringing). The voltage on the double layer capacitor C23 is referred to herein as $V_{BAK}$. As illustrated, $V_{BAK}$ is used to power both the Real Time Clock, U5, (See FIG. 3C) and a switch which includes transistor Q2 (See FIG. 3B), the purpose of which will be explained hereinafter.

The AC powered full wave rectifier bridge 42 has a DC output which is passed through diode D14 to a voltage regulator circuit U6, the output of which is 5 volts DC in the preferred embodiment of the invention. That output voltage is referred to herein as $V_{FE}$. This voltage, $V_{FE}$, will be present whenever a ringing signal is present on the telephone line 16. At that time, the presence of $V_{FE}$ causes the microcontroller, U4, (See FIG. 3C) to have an output called PRE-CHARGE which goes through R27 and D12 (See FIG. 3A) to help charge double layer capacitor C23. This charging path for double layer capacitor C23 is based upon the AC current which can be drawn from the telephone line 16 while the MIU 10 is in an on-hook (and ringing) state.

As described above, when the telephone is ringing, the AC full wave rectifier bridge 42 passes current through diode D14. This current charges capacitor C25. As shown, capacitor C25, in turn, supplies voltage to voltage regulator U6 whose output is $V_{FE}$. That voltage, $V_{FE}$, corresponds to the 5 volt output of the voltage regulator, U6, which is used to power microcontroller, U4, through its $V_{CC1}$ input. One output of the microcontroller, U4, is fed through R27 to charge double layer capacitor C23 if double layer capacitor C23 is capable of receiving additional charge. Thus, the microcontroller, U4, acts as an intelligent charger for the double layer capacitor C23. An advantage of this approach is that if the double layer capacitor C23 was to become discharged, thereby causing the Real Time Clock, U5, to lose power, the microcontroller, U4, will recognize that event, seize the line the next time the phone rings, and recharge the double layer capacitor C23 using the high current available from an off-hook line, rather than by using either leakage current (from an on-hook line). The energy which is stored in capacitor C25 can be used to power MIU 10, even when the double layer capacitor C23 (which powers the Real Time Clock, U5) has been totally discharged. Thus, the MIU 10 of the present invention differs from the prior art MIUs in that it will continue to be capable of operation even if the double layer capacitor C23, which powers the Real Time Clock, U5, becomes totally discharged.

The operation of the MIU 10 can be described as one which is always in one of three distinct states. In particular, it is either in the idle state which corresponds to an on-hook condition, an off-hook state, or a "pre-off-hook" state. In the idle state, the input impedance (when viewed from the phone line) MIU 10 must beat least 5 megohms in order to comply with the regulatory limits on drawing DC current from the telephone line 16. In the idle state, the only portion of the MIU's circuitry which must be on is the Real Time Clock, U5, which receives its power from the double layer capacitor C23.

In the pre-off-hook state, the MIU 10 may draw current in excess of that which is imposed by a 5 megohm resistor across its tip and ring inputs 44, 46. However, it is only in the pre-off-hook state in anticipation of making a transition to a full off-hook state. The MIU 10 enters the pre-off-hook state or when it is triggered by an alarm or by the Real Time Clock, U5, to call home. The pre-off-hook state is used to energize components, in addition to the Real Time Clock, U5, so that the MIU 10 can determine whether or not the telephone is in use by the customer prior to the MIU 10 seizing of the telephone line 16. If the telephone is already in use, then the MIU 10 will not try to seize the line 16. Alternatively, if the MIU 10 determines that the telephone line 16 is not in use, then it will proceed to seize the line 16 and make a call to the central computer 20.

The final state which the MIU can be in is the full-off-hook state. In the full off-hook state the MIU 10 seizes the telephone line 16, and it calls a central computer 20 to report either a reading or an alarm condition.

In accordance with standards established by the American National Standards Institute ("ANSI"), the determination of whether a telephone line 16 is on-hook or off-hook corresponds to the voltage differential which is present between the tip and ring lines 44, 46. If that voltage is at least 21 volts, then the telephone line 16 is considered to be on-hook, while if it is 19 volts or less, then the telephone line 16 is considered to be off-hook. In order to determine whether the telephone line 16 is on-hook or off-hook, the microcontroller, U4, includes an analog-to-digital ("A/D") converter. The A/D converter on the microcontroller, U4, is used to determine whether the telephone line 16 is on-hook or off-hook while the MIU 10 is in its pre-off-hook state. When the MIU 10 goes into its pre-off-hook state, in anticipation of making a call to the central computer 20, it must first determine whether the customer is already using the telephone, i.e., whether the telephone was in the on-hook state or the off-hook state. If it determines that the telephone 18 (See FIG. 1) was in the on-hook state, then it will proceed with the call, while if it determines that the telephone 18 was in the off-hook state, it will defer making the call until the telephone line 16 is available. While in the pre-off-hook state, very little current is drawn from the telephone line 16. Accordingly, if the telephone line 16 was in use when the MIU 10 went into the pre-off-hook state, the user would not be disturbed by any "clicking" noise on the line. In that event, once the MIU 10 has determined that the telephone 18 was in use, the MIU 10 would reset and wait for some period of time before again entering the pre-off-hook state, testing whether the telephone line 16 was in use, and (if the telephone line 16 was available) making its call to the central computer 20.

In the pre-off-hook state, a voltage is placed on the WAKE line which turns on transistors Q2 and Q4 and turns off transistor Q6. Thus, with transistor Q4 on, the voltage on LINE will be imposed (through transistor Q4) upon the voltage divider defined by resistors R35 and R39. The voltage at the junction of resistors R35 and R39 is fed into one of the A/D inputs of microcontroller, U4. The microcontroller, U4, will make a determination as to whether the value of the input voltage to the MIU 10 on the telephone line is greater than about 21 volts (meaning the telephone 18 was on-hook) or less than about 19 volts (meaning that the telephone 18 was off-hook).

If the telephone is on-hook, then the microcontroller, U4, sends a signal on SEIZE line to turn on transistors Q5 and Q3. The circuit made up of transistors Q8 and Q9, resistors R13, R17, and R24, diodes D6, D9, and D10, and capacitor C10 acts as an electronic inductor. Accordingly, that circuit acts as a low impedance to DC so that Q3 is connected to capacitor C25 through resistor R29 and diode D15, allowing C25 to charge while the MIU 10 is in the off-hook state. On the other hand, the electronic inductor circuit acts as a high impedance to AC signals, so that modem signals which are sent on LINE (while the MIU 10 is dialing and communicating with the central computer 20) will not be passed to ground by the electronic inductor circuit.

With Q8 and Q9 on, there is a path through Q3 and Q9 through diode D14 to capacitor C25 and voltage regulator U6. There is a voltage divider made up of resistors R36 and R40 (See FIG. 3B). The voltage at the junction of resistors R36 and R40 is fed into one of the A/D inputs of microcontroller, U4, where it can be used to determine whether telephone 18 has been picked up by a user while the MIU 10 is using the line 16. Thus, the MIU 10 is able to determine that a user is trying to make a telephone call, in which case, the MIU 10 will give up the line in favor of the user. This is a type of parallel off-hook detect which could be used by the circuit. Alternative parallel off-hook detect circuits are known in the art, with one example being described in U.S. Pat. No. 5,422,939 which issued on Jun. 6, 1995 to R. Kramer, et al. The way in which the R36 and R40 voltage divider operates is that an initial sample of the voltage at the junction between R36 and R40 is sampled and stored by the microcontroller, U4. Periodically, while the MIU 10 is in use, samples are taken of the voltage present at the junction of R36 and R40. If the sample voltage at the junction of R36 and R40 was to drop by more than a predetermined amount, then the microcontroller, U4, could determine that another instrument at the customer's premises (e.g., an extension phone, a computer modem, a fax machine, or an automatic dialer) had gone off-hook. In such case, the MIU 10 will drop the connection in favor of the other user.

In another aspect of the MIU 10 of the present invention, the MIU 10 includes a novel coupling circuit which connects the MIU 10 to a meter 12. Generally, in the connection of an MIU to a meter, the MIU is expected to provide the meter with timing signals which enable the MIU to be interrogated serially in order to obtain data from the meter. In the past, several circuit elements were generally used in an MIU in order to couple both timing signals and power to the meter in order to enable an MIU to obtain the data from the meter. Generally, the timing signals which must be coupled to the meter are square waves having a defined frequency and duty cycle.

Figure 3A:
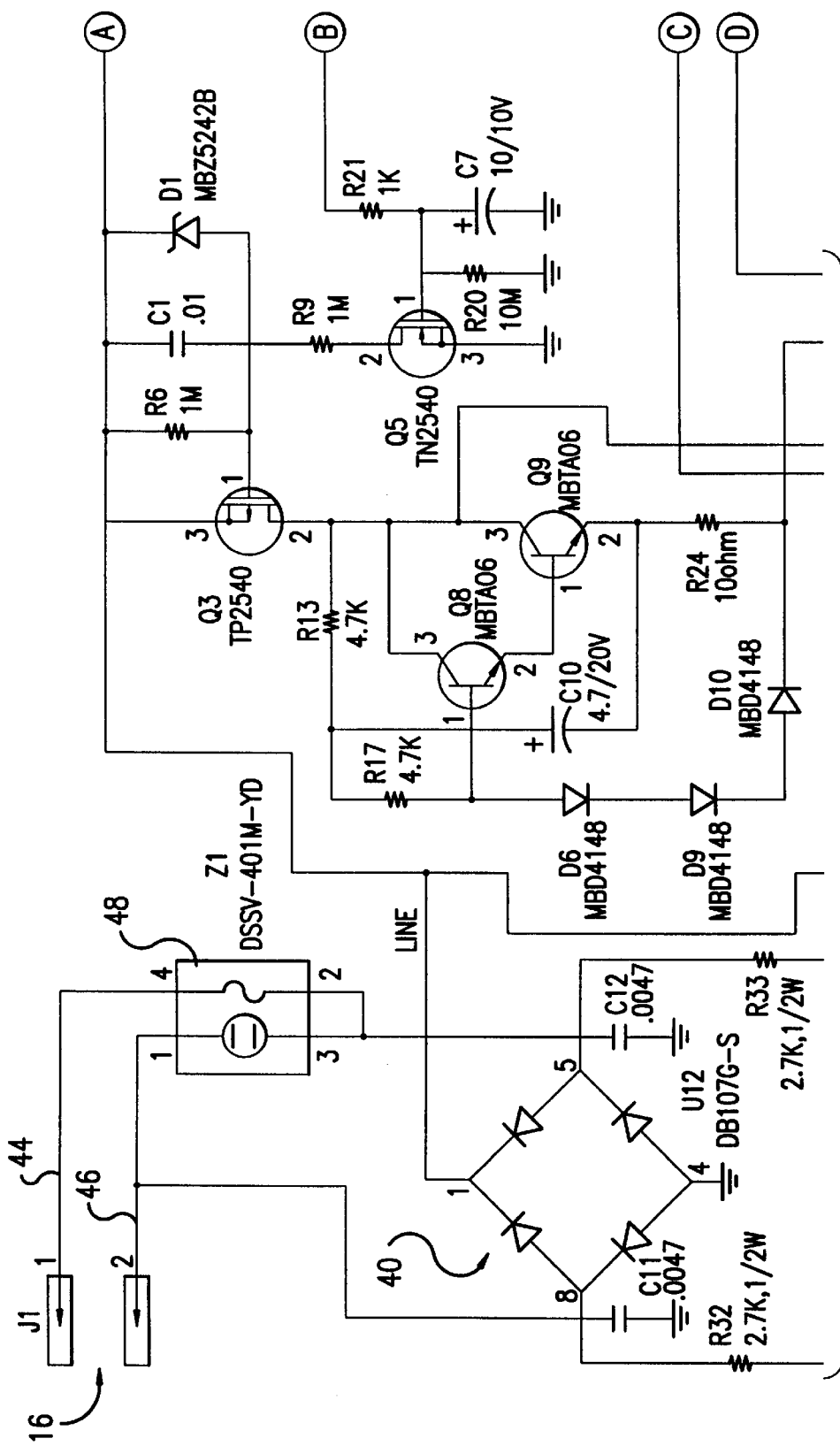
FIGS. 3A–3H, together, make up a detailed schematic diagram of the MIU of the present invention.
Figure 3B:
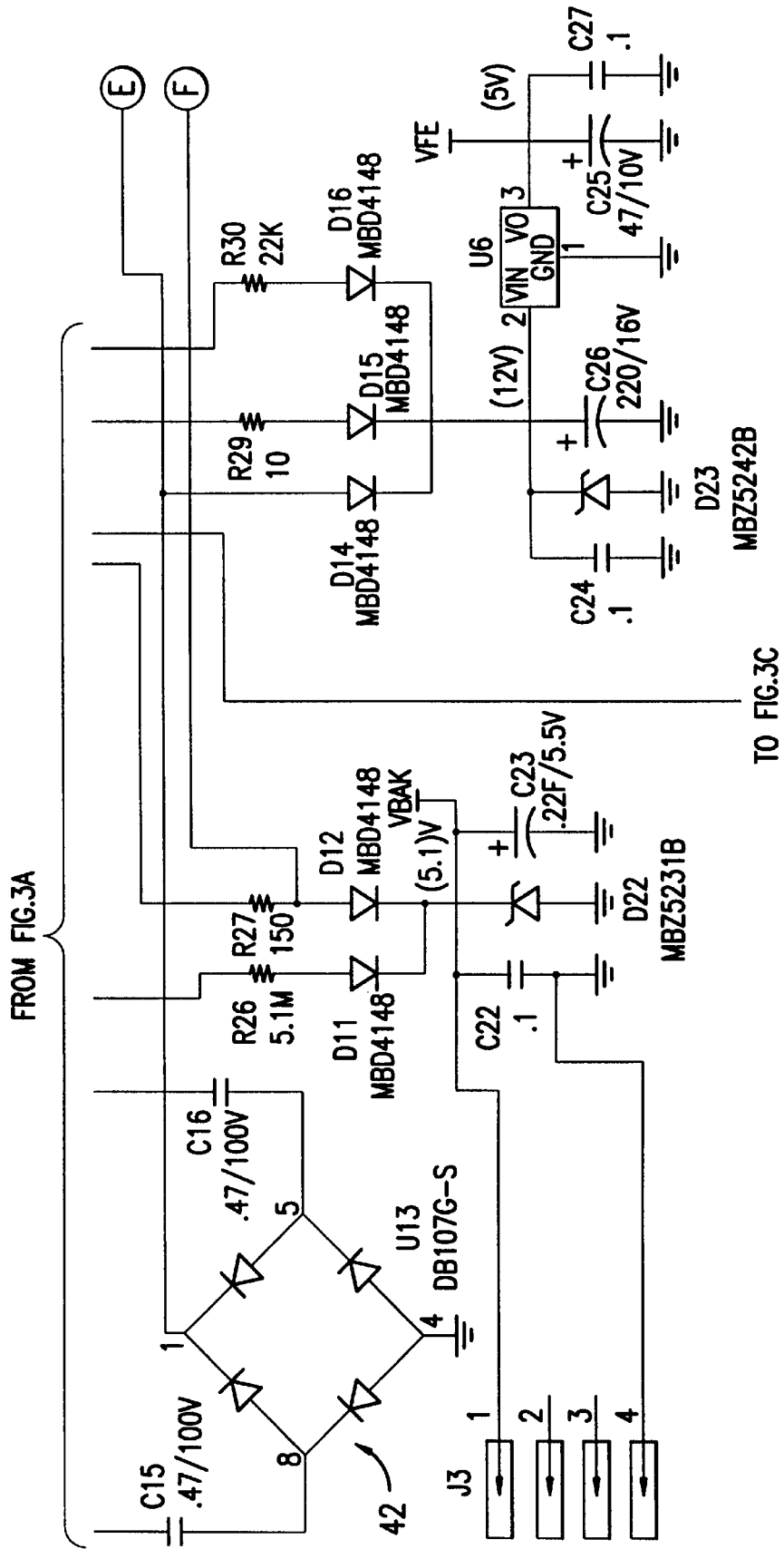
Figure 3C:
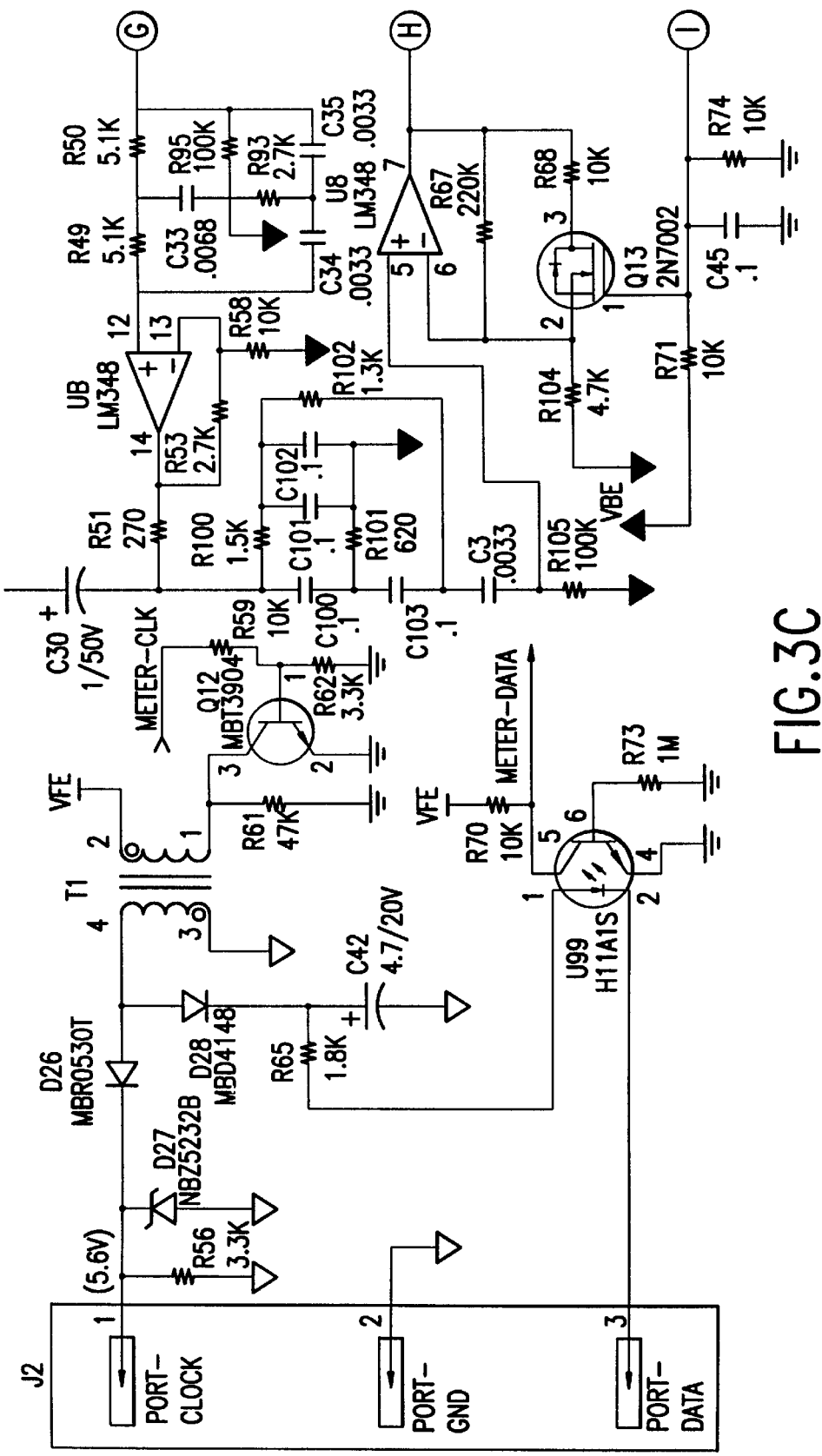
Figure 3D:
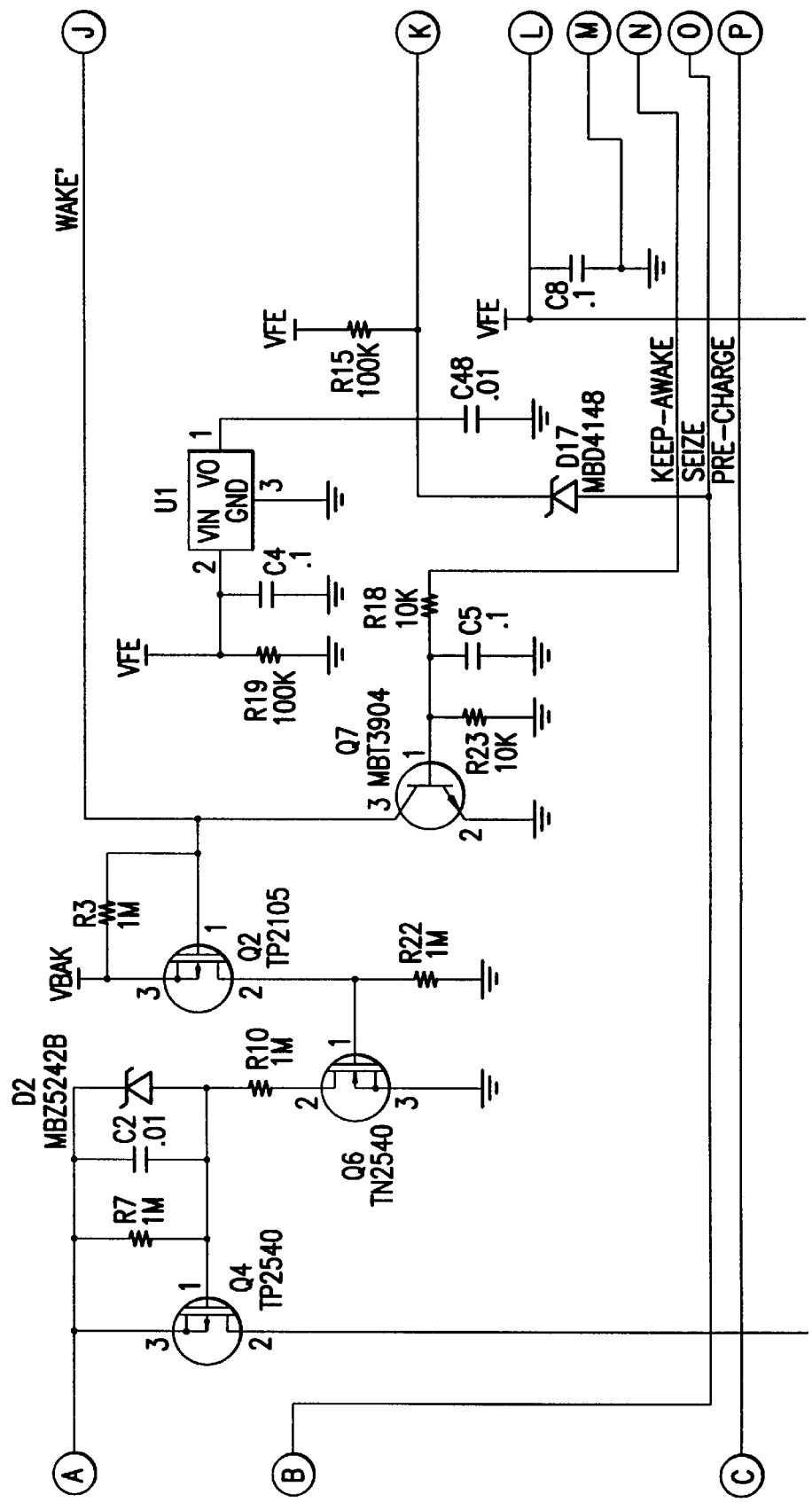
Figure 3E:
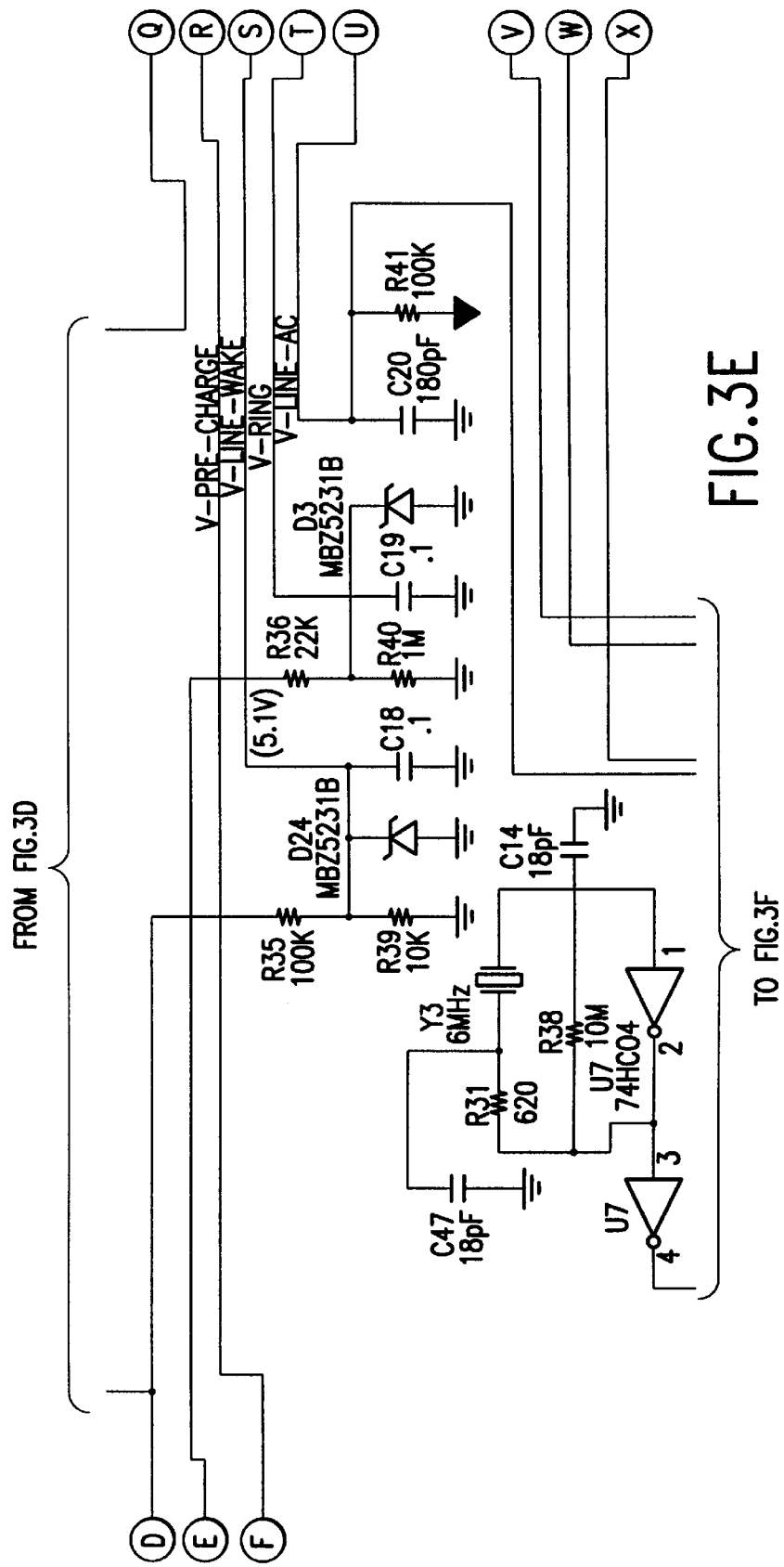
Figure 3F:
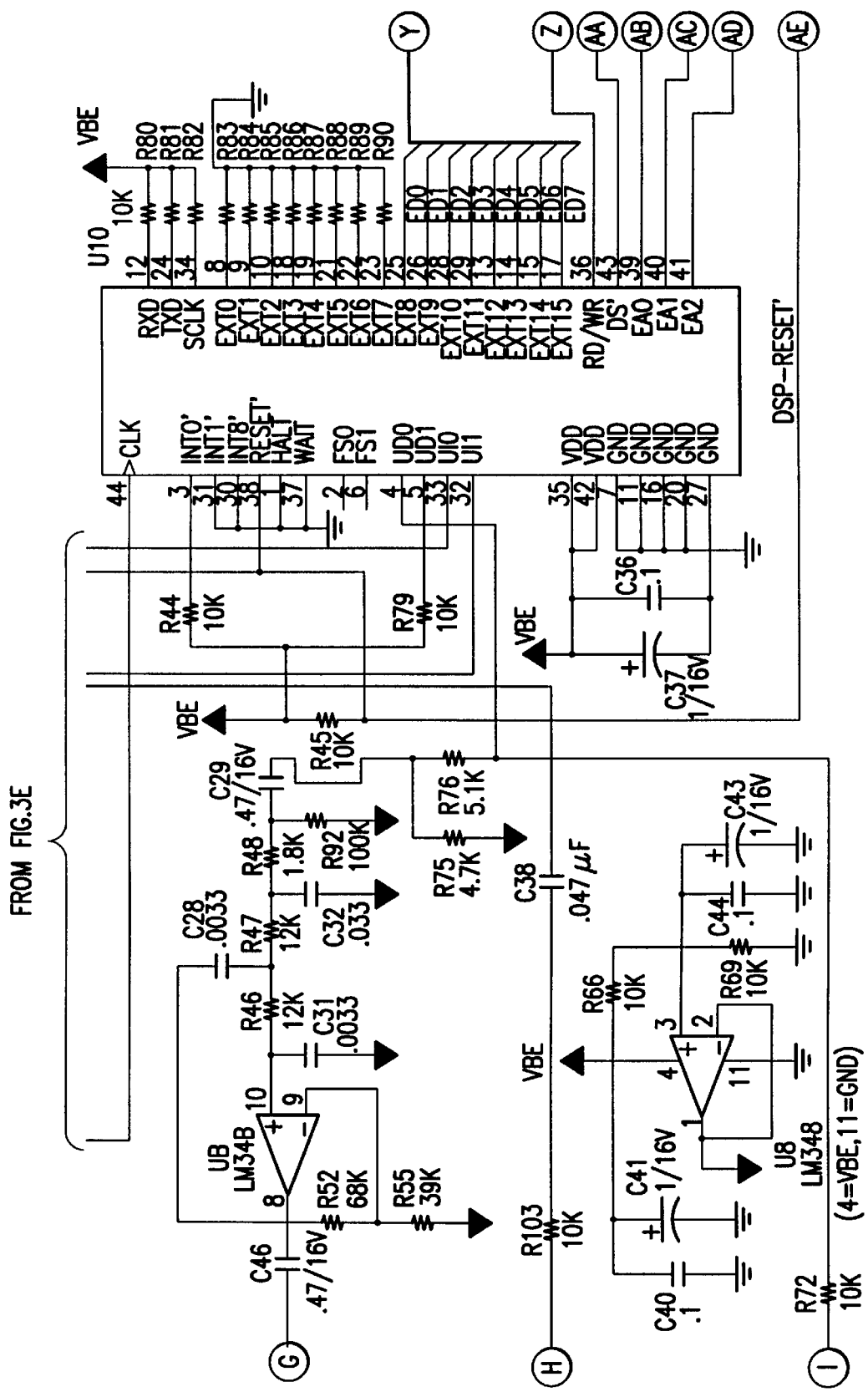
Figure 3G:
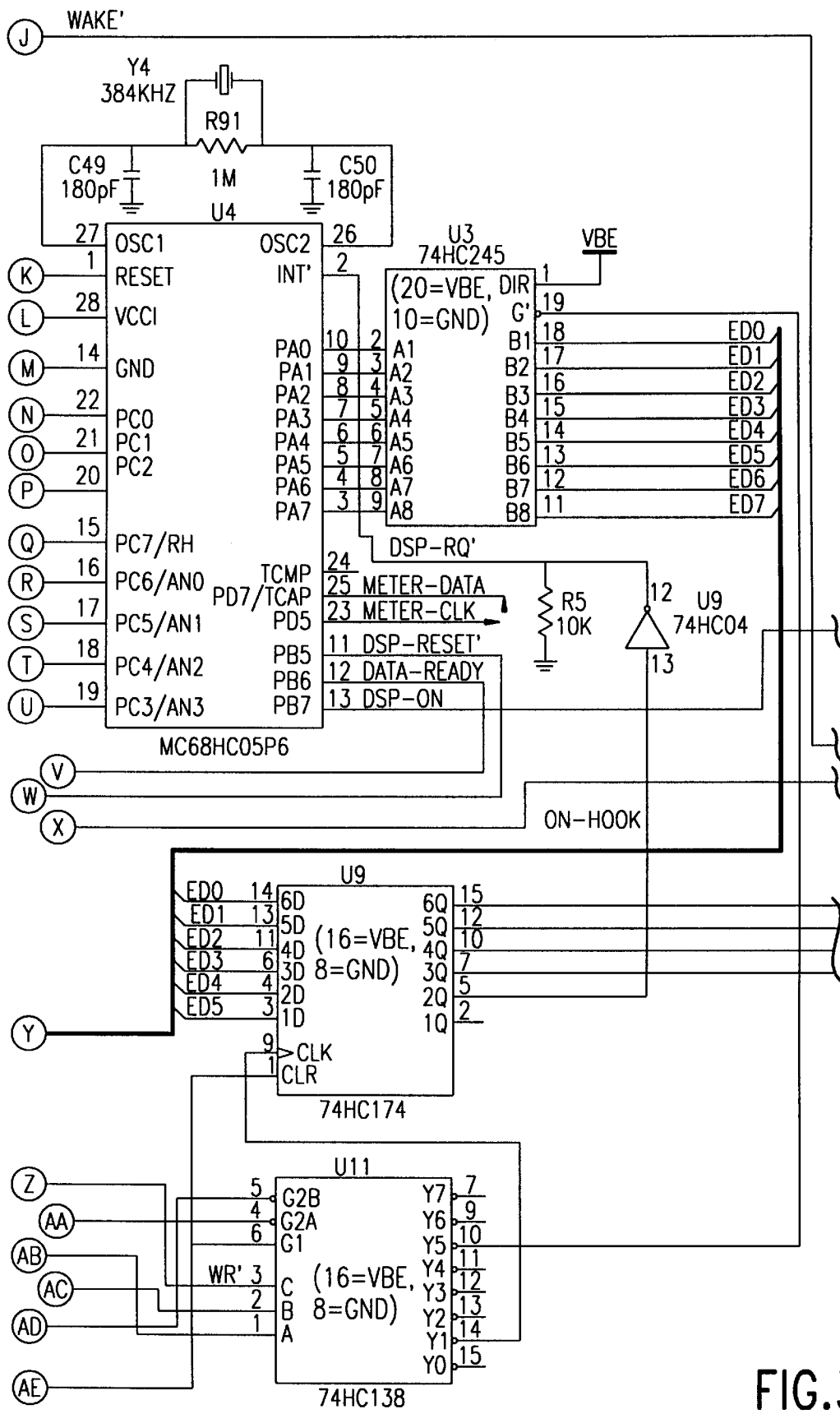
Figure 3H:
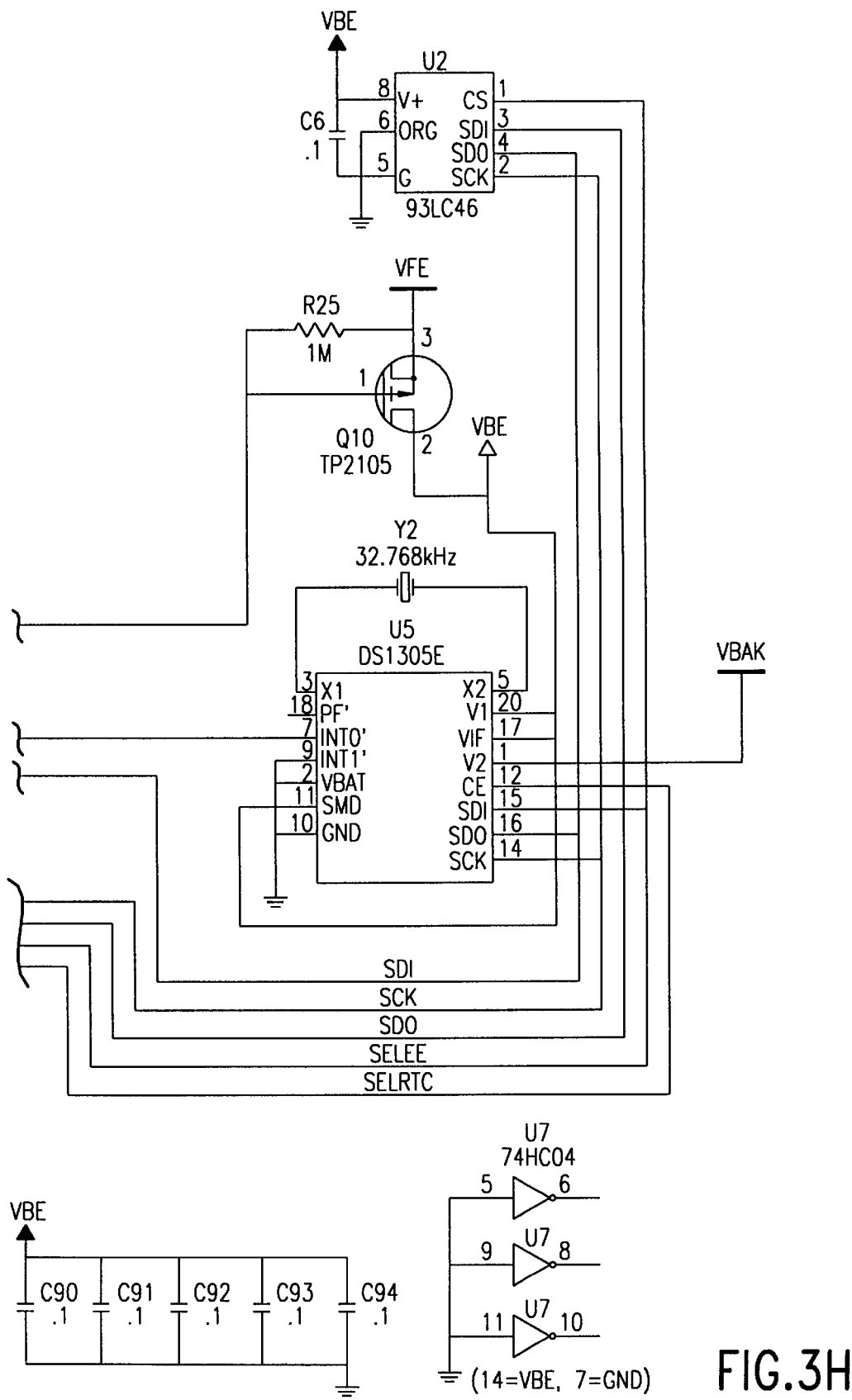

In accordance with one aspect of the present invention, a unique circuit, illustrated both in FIGS. 3A and 3C, is used. In particular (with reference to FIG. 3C), a signal called METER-CLK is used to turn on a transistor Q12, allowing $V_{FE}$, to be coupled through transformer, T1, and diode, D26, to a terminal called PORT-CLOCK on connector J2. Connector J2 further includes a second terminal, called PORT-GND, which is used to couple the ground of the meter 12 to the ground of the MIU 10 and a third terminal, called PORT-DATA, which is used to couple data signals from the meter 12 to the MIU 10.

With continued reference to FIG. 3C, the optoisolator, Q99, is comprised of a light emitting diode ("LED") which is optically coupled to a light sensitive NPN transistor. Accordingly, when current is passed from the transformer, T1, through diode D28 and resistor R35 into the anode of the LED, if the cathode of the LED is connected to the ground of the MIU 10, the NPN transistor portion of the MIU 10 will turn on, thereby bringing the voltage at the collector of the NPN transistor from $V_{FE}$ to ground. As the voltage on the collector of the NPN transistor corresponds to a signal called METER-DATA, a signal from meter 12 can be coupled to the connector called PORT-DATA of the MIU 10 while remaining isolated from the other circuitry of the MIU 10 by means of optoisolator Q99. Thus, when meter 12 is used to connect PORT-DATA to PORT-GND, optoisolator Q99 turns on bringing METER-DATA (at the collector of the NPN transistor portion of Q99) to ground from $V_{FE}$, thereby coupling data from meter 12 to the MIU 10. As illustrated, the present invention thereby provides timing and power signals to the meter 12 by means of transformer, T1, and it couples data signals back to the MIU 10 using optoisolator Q99. Thus, in accordance with the invention, only two elements are used to both couple and isolate the MIU 10 and the meter 12, thereby providing isolation of the circuitry of the MIU 10 and the meter 12.

We claim:

1. An MIU (meter interface unit) which is capable of deriving its power from a telephone line and capable of data transmission to a central computer over the telephone line, said MIU comprising:

(a) means for receiving data;

(b) means for transmitting data;

(c) means for determining the time at which said means for receiving data and said means for transmitting data are to be active;

(d) means for coupling a telephone line to said data transmitting means, said telephone line alternatingly maintaining an on-hook and an off-hook condition;

(e) means for obtaining a DC current from said telephone line, wherein a DC leakage current is obtained during an on-hook condition and a DC current greater than said DC leakage current is obtained during an off-hook condition;

(f) means for obtaining an AC current from said telephone line during an on-hook ringing condition;

(g) long term storage means for storing a charge derived from said DC current and from AC current, wherein said long term storage means is capable of energizing said interface unit throughout the duration of said on-hook condition, and wherein said determining means is continuously energized by said long term storage means whenever said telephone line is in said on-hook condition.

2. The MIU of claim 1, wherein said means for receiving data comprises a modem.

3. The MIU of claim 2, wherein said modem is comprised of a programmed microcontroller in combination with a digital signal processor.

4. The MIU of claim 1, wherein said means for transmitting data comprises a modem.

5. The MIU of claim 4, wherein said modem is comprised of a programmed microcontroller in combination with a digital signal processor.

6. The MIU of claim 1, wherein said means for determining the time at which said means for receiving data and said means for transmitting data are to be active comprises a real time clock integrated circuit.

7. The MIU of claim 1, wherein said means for obtaining a DC current from said telephone line, comprises a first full wave rectifier circuit.

8. The MIU of claim 7, wherein said means for obtaining an AC current from said telephone line during an on-hook ringing condition comprises a second full wave rectifier circuit, said second full wave rectifier circuit being isolated from ground by capacitors.

9. The MIU of claim 1, wherein said means for obtaining an AC current from said telephone line during an on-hook ringing condition comprises a full wave rectifier circuit, said full wave rectifier circuit being isolated from ground by capacitors.

10. The MIU of claim 1, wherein said long term storage means comprises a double layer capacitor.

11. The MIU of claim 1, wherein said long term storage means comprises a rechargeable battery.

12. The MIU of claim 11, wherein said rechargeable battery is a rechargeable lithium battery.

* * * * *